US006656394B2

(12) United States Patent
Kelly

(10) Patent No.: US 6,656,394 B2
(45) Date of Patent: Dec. 2, 2003

(54) METHOD AND APPARATUS FOR HIGH THROUGHPUT GENERATION OF FIBERS BY CHARGE INJECTION

(75) Inventor: Arnold J. Kelly, Princeton Junction, NJ (US)

(73) Assignee: Charge Injection Technologies, Inc., Monmouth Junction, NJ (US)

(*) Notice: Subject to any disclaimer, the term of this patent is extended or adjusted under 35 U.S.C. 154(b) by 237 days.

(21) Appl. No.: 09/785,088

(22) Filed: Feb. 16, 2001

(65) Prior Publication Data

US 2001/0046599 A1 Nov. 29, 2001

Related U.S. Application Data

(60) Provisional application No. 60/183,450, filed on Feb. 18, 2000.

(51) Int. Cl.[7] .................................................. B29B 9/00
(52) U.S. Cl. ......................................................... 264/10
(58) Field of Search ................................ 264/10; 425/6, 425/174.6; 428/359, 401

(56) References Cited

U.S. PATENT DOCUMENTS

| | | | |
|---|---|---|---|
| 1,974,504 | A | 10/1934 | Formhals |
| 2,265,742 | A | 12/1941 | Norton |
| 4,011,067 | A | 3/1977 | Carey, Jr. |
| 4,043,331 | A | 8/1977 | Martin et al. |
| 4,044,404 | A | 8/1977 | Martin et al. |
| 4,069,026 | A | 1/1978 | Simm et al. |
| 4,127,706 | A | 11/1978 | Martin et al. |
| 4,255,777 | A | 3/1981 | Kelly |
| 4,991,774 | A | 2/1991 | Kelly |
| 5,093,602 | A | 3/1992 | Kelly |
| 5,378,957 | A | 1/1995 | Kelly |
| 5,391,958 | A | 2/1995 | Kelly |
| 5,478,266 | A | 12/1995 | Kelly |
| 6,106,913 | A | 8/2000 | Scardino et al. |
| 6,161,785 | A | 12/2000 | Kelly |
| 6,183,670 | B1 | 2/2001 | Torobin et al. |
| 6,206,307 | B1 | 3/2001 | Kelly et al. |
| 6,227,465 | B1 | 5/2001 | Kelly |
| 6,269,513 | B1 | 8/2001 | Torobin |
| 6,315,806 | B1 | 11/2001 | Torobin et al. |

FOREIGN PATENT DOCUMENTS

| | | |
|---|---|---|
| GB | 1527592 | 10/1978 |
| WO | WO 98/03267 A1 | 1/1998 |
| WO | WO 99/18893 A1 | 4/1999 |
| WO | WO 00/22207 A2 | 4/2000 |
| WO | WO 00/67694 A1 | 11/2000 |
| WO | WO 01/26610 A1 | 4/2001 |
| WO | WO 01/27365 A1 | 4/2001 |

OTHER PUBLICATIONS

Phillip Gibson and Heidi Schreuder–Gibson, Effect Of Deformation On The Porosity And Transport Characteristics Of Elastomeric Electrospun Nonwoven Membranes (date not known).

(List continued on next page.)

*Primary Examiner*—Leo B. Tentoni
(74) *Attorney, Agent, or Firm*—Lerner, David, Littenberg, Krumholz & Mentlik, LLP

(57) ABSTRACT

A fiber is formed by providing a stream of a solidifiable fluid, injecting the stream with a net charge so as to disrupt the stream and allowing the stream to solidify to form fibers.

31 Claims, 10 Drawing Sheets

OTHER PUBLICATIONS

Shahrzad Zarkoob, Darrell H. Reneker, R.K. Eby, Steven D. Hudson, Dale Ertley, Wade W. Adams, Structure and Morphology Of Nano Electrospun Silk Fibers, Polymer Preprints, vol. 39, No. 2, Aug. 1998, pp. 244–245.

Raimund Jaeger, Michel M. Bergshoef, Cristina Martin I Batlle, Holger Schönherr, G. Julius Vansco, Electrospinning of Ultra–Thin Polymer Fibers, Rolduc Polymer Meeting 10 "Petro" Polymers v. "Green" Polymers, May 5–7, 1997, pp. 141–150.

Peter K. Baumgarten, Electrostatic Spinning of Acrylic Microfibers, Journal of Colloid and Interface Science, vol. 36, No. 1, May 1971.

L. Larrondo and R. St. John Manley, Electrostatic Fiber Spinning from Polymer Melts. I. Experimental Observations on Fiber Formation and Properties, Journal of Polymer Science, vol. 19, No. 6, Jun. 1981, pp. 909–920.

L. Larrondo and R. St. John Manley, Electrostatic Fiber Spinning from Polymer Melts. II. Examination of the Flow Field In An Electrically Driven Jet, Journal of Polymer Science, vol. 19, No. 6, Jun. 1981, pp. 922–932.

L. Larrondo and R. St. John Manley, Electrostatic Fiber Spinning from Polymer Melts. III. Electrostatic Deformation of a Pendant Drop of Polymer Melt, Journal of Polymer Science, vol. 19, No. 6, Jun. 1981, pp. 934–940.

Darrell H. Reneker and Iksoo Chun, Nanometre Diameter Fibres Of Polymer, Produced By Electrospinning, Nanotechology, vol. 7, No. 3, Sep. 1996, pp. 216–223.

Jong–Sang Kim and Darrell H. Reneker, Polybenzimidazole Nanofiber Produced by Electrospinning, Polymer Engineering and Science, vol. 39, No. 5, May 1999, pp. 849–854.

Hao Fong and Farrell H. Reneker, Electrospinning and the Formation of Nanofibers, Structure Formation in Polymeric Fibers, Chapter 6, pp. 1–23 (date not known).

Abstract of Japan 03220305A (Sep. 27, 1991).

A. Buer, S.C. Ugbolue, and S.B. Warner, Electrospinning And Properties of Some Nanofibers, Textile Research Journal, 71(4), 323–328 (2001).

Y.A. Dzenis and D.H. Reneker, Polymer Hybrid Nano/Micro Composites, Proceedings Of The American Society For Composites, 1994, pp. 657–665.

Phillip Gibson, Heidi Schreuder–Gibson and Christopher Pentheny, Electrospinning Technology: Direct Application Of Tailorable Ultrathin Membranes, Journal Of Coated Fabrics, vol. 28—Jul. 1998, pp. 63–73.

Stanley E. Ross, Electrospinning: The Quest For Nanofibers, IFJ Oct. 2001, pp. 50–53.

Jayesh Doshi, Nanofiber Based Nonwoven Composites, Its Properties, and Applications, eSpin Technologies, Inc., date unknown.

Michel M. Bergshoef and G. Julius Vansco, Transparent Nanocomposites With Ultrathin Electrospun Nylon–4,6 Fiber Reinforcement, Advanced Materials, 1999, 11, No. 16, pp. 1362–1365.

Bill Smith, U.S. Army Develops Fabric Membrane To Provide Multipurpose Protection, Technical Textiles Int'l, p. 6, May 1998,

METHOD AND APPARATUS FOR HIGH THROUGHPUT GENERATION OF FIBERS BY CHARGE INJECTION

CROSS-REFERENCE TO RELATED APPLICATIONS

This application claims benefit of U.S. Provisional Application Ser. No. 60/183,450, filed Feb. 18, 2000, the disclosure of which is hereby incorporated by reference herein.

FIELD OF THE INVENTION

The present invention relates to electrostatic methods and apparatus for forming fibers from fluids.

BACKGROUND OF THE INVENTION

In conventional commercial production of low diameter fibers, a liquid material such as a liquid polymer is forced through a small orifice in an apparatus referred to as a spinneret. The liquid polymers utilized in many fibers are extremely viscous and difficult to pass through a small orifice. These methods encounter practical difficulties.

Certain methods of electrostatic formation of fibers from liquid polymers are known. These methods use an electrode defining an orifice. The liquid is passed through the orifice, from a first side of the electrode to a second side. An oppositely charged surface is remotely disposed with respect to the electrode, on the second side of the electrode, to attract and collect the fibers formed after the fluid issues from the orifice. These methods require large potential differences developed over the large air gap between the orifice and the charged surface on which the fibers are collected. The electric field developed over the air gap is relied upon to develop the necessary charge within the fluid and attenuate the fluid. The attenuated fluid then solidifies into fibers. For low conductivity fluids, such as liquid polymers utilized to develop fibers for commercial applications such as fabrics, the flow rates attained by these methods are unacceptable. Known methods also include the use of a capillary needle as the electrode and orifice discussed above. Fibers having diameters of 50 nanometers and up have been produced utilizing these methods.

Electrostatic formation of fibers has great potential and it has been known that electrostatic formation of fibers would present a much more convenient and efficient method of producing fibers. However, despite considerable effort to develop these methods, these methods have been unable to handle commercially acceptable flow rates.

SUMMARY OF THE INVENTION

The present invention addresses these needs.

In accordance with one aspect of the present invention, a method of producing fibers comprises providing a stream of a solidifiable fluid, providing the stream with a net charge so as to disrupt the stream by passing the stream through a body defining an orifice so that the stream passes through an electric field before exiting the orifice, and allowing the disrupted stream to solidify to form fibers. "Solidify" as used herein, means a marked change in viscosity or change in state such that the material tends to retain a definite shape. "Solidify" as used herein includes a change in the fluid to an elastomeric fiber, rigid or semi-rigid fibers, and solid or semi-solid fibers.

Preferably, the step of providing the stream with a net charge includes injecting a net charge into the stream. The step of injecting a net charge preferably includes injecting a net charge so as to develop a self electric field for the stream of at least 0.5 megavolts per meter. Charge injection of the solidifiable fluid achieves a high charge density in the fluid. Charge injection creates a strong "self-field" within and in proximity to the fluid stream, and the fluid stream forms fibers under the influence of the self-field.

In certain preferred embodiments, a pair of electrodes is provided in the vicinity of the orifice while a potential difference is maintained between the electrodes. One of the pair of electrodes may comprise the body. An electric field is developed between the electrode and the body so that the stream is provided with a net charge. Charge injection occurs within the stream of fluid, in the space between the electrode and the body defining the orifice.

The self-field within and immediately surrounding the fluid stream causes the fluid stream to break into highly elongated filaments which solidify to form solid fibers. A further surface remote from the orifice such as a container or a collection reel may be used to collect the fibers. This surface may be at the same potential as the body defining the orifice, or may be at a different potential. However, there is no need to provide a large potential difference between this surface and the body. Typically, both the body defining the orifice and the collecting surface are grounded.

The limit on the flow rate of the solidifiable fluid is the size of the orifice so that throughput orders of magnitude greater than the known electrostatic methods is achieved. The improved throughput is surprising. Embodiments in accordance with the invention have achieved throughputs great enough for industrial production of fibers.

The method, in certain preferred embodiments, comprises heating the disrupted stream as it passes out of the orifice. The step of providing the stream with a net charge preferably provides the stream with a charge density of at least 0.5 coulombs per cubic meter.

The step of injecting a net charge, in certain preferred embodiments, comprises passing the stream past an electron gun located adjacent the orifice.

The step of providing a stream of a solidifiable fluid may comprise passing the solidifiable fluid through an orifice at a rate of at least 0.1 grams per second, in certain embodiments, or a rate of at least 0.5 grams per second, in other embodiments. The solidifiable fluid may be passed through an orifice at a rate of at least 1 gram per second.

The step of providing a stream of solidifiable fluid may include heating a polymeric material and the step of allowing the stream to solidify may comprise allowing the disrupted stream to cool. The step of providing a stream of a solidifiable fluid may comprise providing a polymeric material in a solvent and the step of allowing the stream to solidify may comprise allowing the solvent to evaporate.

The solidifiable fluid may comprise a liquid polymer, for example. In certain preferred embodiments, the liquid polymer comprises a molten polymer.

The solidifiable fluid may comprise a liquid glass, a liquid polyester, such as polytetrafluoroethylene, polyethylene terephthalate ("PET"), polybutylene terephthalate, or a liquid thermoplastic polyurethane.

The solidifiable fluid may comprise a liquid solution including a polymeric material, such as LEXAN® and methylene chloride, or tetrahydrofurane and urethane.

Another aspect of the present invention, is an electrostatically formed fiber produced by the providing a stream of a solidifiable fluid, providing the stream with a net charge so as to disrupt the stream by passing the stream through a body defining an orifice so that the stream passes through an electric field prior to exiting the orifice, and allowing the disrupted stream to solidify to form fibers. The fiber may be formed of a polyester, a polytetra fluoroethylene, polyethylene terephthalate, polybutylene terephthalate, thermoplastic polyurethane, carbon, or glass. The fibers preferably have a diameter of less than 100 micrometers, more preferably less than 10 micrometers. In certain preferred embodiments, the fiber has a diameter of less than 500 nanometers, preferably less than 100 nanometers, even more preferably less than 20 nanometers.

In another aspect of the present invention, a method of producing fibers comprises providing a plurality of streams of solidifiable fluid. Each of the plurality of streams is provided with a net charge so as to disrupt the streams by passing each stream through a structure defining an orifice so that the stream passes through an electric field prior to exiting the orifice. Each disrupted stream is allowed to solidify to form fibers. Orifices for multiple streams may be utilized in an assembly for generating fibers on a large scale.

In another aspect of the present invention, a method of forming a charged solid comprises providing a stream of a solidifiable fluid, providing the stream with a net charge by passing the stream through a body defining an orifice so that the stream passes through an electric field prior to exiting the orifice, and allowing the stream of solidifiable fluid to solidify while still charged. In certain preferred embodiments, the stream disrupts under the influence of the net charge. Preferably, the stream of solidifiable fluid has a maximum charge mobility of $10^{-6}$ $m^2/V{\cdot}sec$. Preferably, the stream of solidifiable fluid has a minimum net charge of 0.1 coulombs per cubic meter.

In yet another aspect of the present invention, an apparatus for producing fibers comprises a feed system adapted to deliver a stream of molten polymeric material, and a charge injection device adapted to provide the stream with a net charge so as to disrupt the stream, said device comprising a body defining an orifice and being arranged so that the stream passes through an electric field prior to exiting the orifice.

The feed system preferably comprises at least one heater for melting the polymeric material. In certain preferred embodiments, the charge injection device comprises a pair of electrodes, in which one of the pair of electrodes comprises the body defining the orifice. In other embodiments, the charge injection device comprises an electron gun.

In another aspect of the present invention, a method of forming fibers comprises providing a stream of a solidifiable fluid at a rate of at least about 0.02 grams per second, injecting electrical charge into the stream of solidifiable fluid, whereby the stream will tend to disperse and form filaments, and solidifying the filaments. The method preferably comprises injecting electrical charge so as to inject at least about 1 coulomb per cubic meter. The method preferably comprises providing the stream of fluid at a rate of at least 0.1 gram per second and more preferably at least 1 gram per second.

In another aspect of the present invention, a method of forming fibers comprises providing a stream of a solidifiable fluid, injecting at least about 1 coulomb of electrical charge per cubic meter of fluid into the stream of solidifiable fluid, whereby the stream will tend to disperse and form filaments and solidifying the filaments. Preferably, the stream is provided at a rate of at least about 0.02 grams per second.

In another aspect of the present invention, a method of forming fibers comprises providing a stream of a solidifiable fluid at a rate of at least about 0.03 milliliters per second, injecting electrical charge into the stream of solidifiable fluid, whereby the stream will tend to disperse and form filaments, and solidifying the filaments. The method preferably comprises injecting electrical charge so as to inject at least about 1 coulomb per cubic meter into the solidifiable fluid. The method preferably comprises providing the stream of fluid at a rate of at least 0.1 gram per second and more preferably at least 1 gram per second.

BRIEF DESCRIPTION OF THE DRAWINGS

These and other features, aspects and advantages of the present invention will become better understood with regard to the following description, appended claims and accompanied drawing where:

DETAILED DESCRIPTION

Figure 1:
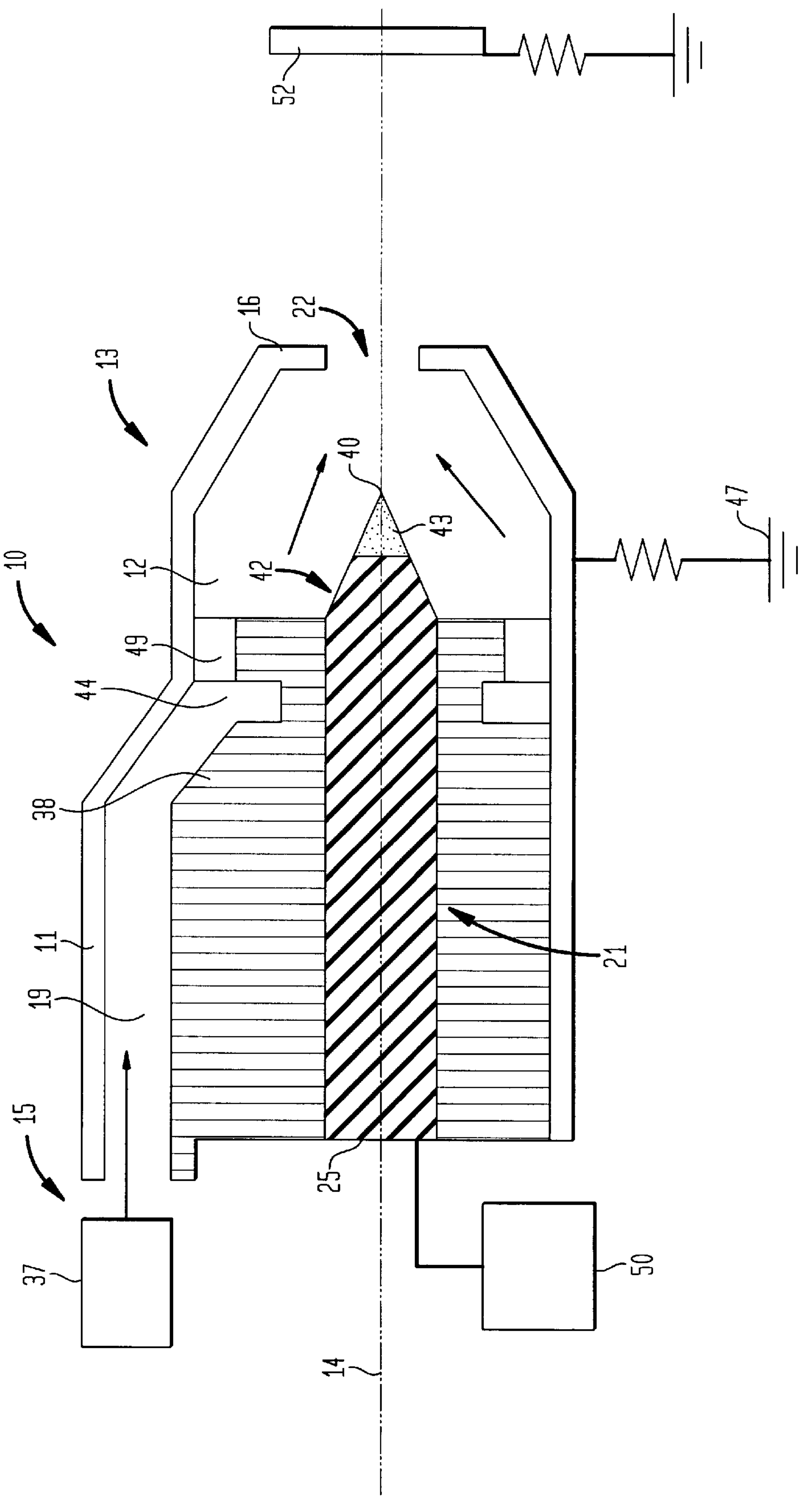
FIG. 1 is a schematic cross-sectional view of an apparatus for performing a method in accordance with an embodiment of the present invention.

An apparatus for performing a method in accordance with an embodiment of the invention comprises a dispersing apparatus 10, as shown in FIG. 1. An electrically conductive metallic body 11 with a central axis 14 has a liquid supply line 19 formed therein and opens into a central chamber 12. The body 11 shown in FIG. 1 has a generally cylindrical shape. A shape including as few corners as possible is preferred. However, the shape of the body 11 is not essential. The body 11 defines a first end 13 and a second end 15 opposite from first end 13 for the apparatus 10. The body 11 defines a forward wall 16 at the first end 13 of the apparatus. The forward wall 16 has an orifice 22 opening therethrough on central axis 14. An electrically insulating support 38 is disposed within the central chamber 12 of the body 11.

Insulator 38 is generally cylindrical and coaxial with the body 11. The insulator defines a plurality of liquid distribution channels 44 extending generally radially and a set of axially extensive grooves 49 adjacent the outer periphery of the insulator. Radial channels 44 merge with one another adjacent the central axis 14 and merge with the grooves 49. Further, the radial channels 44 and axial grooves 49 communicate with the supply line 19 of body 11, so that the supply line is in communication, via the radial channels 44, with all the axial grooves 49 around the periphery of insulator 38. A fluid source 37 delivers a fluid to supply line 19 so that the fluid flows through channels 44 and grooves 49 to the chamber 12. Insulator 38 may be formed of any substantially rigid dielectric material, such as a glass, non-glass ceramic, thermoplastic polymer or thermosetting polymer.

A charge injection device 21 comprises a central electrode 25. A central electrode 25 is mounted within insulator 38 and electrically insulated from the body 11 by insulator 38. Central electrode 25 has a pointed forward end 42 having a tip 40 disposed in alignment with orifice 22 and in close proximity thereto. Preferably, the forward tip 40 of central electrode 25 is formed from a setaceous element having numerous small points 43. For example, the setaceous element may be formed from ytrria stabilized zirconia-tungsten eutectic. Alternatively, the electrode may comprise a metal rod. A ground electrode 52 is mounted remote from body 11 and remote from orifice 22. Although electrode 52 is schematically illustrated as a flat plate in FIG. 1, its geometrical form is not critical. For example, the ground electrode 52 may comprise a drum. Where the atomized liquid is directed into a vessel, pipe or other enclosure, the ground electrode 52 may be a wall of the enclosure.

Ground electrode 52 is at a reference or ground electrical potential. The body 11 is connected via a resistor to the ground potential 47. Tip 40 of central electrode 25 is connected to a voltage potential source 50. The foregoing components of the dispersing apparatus may be generally similar to the corresponding components of the apparatus called the SPRAY TRIODE® atomizer, disclosed in certain embodiments of U.S. Pat. No. 4,255,777, the disclosure of which is hereby incorporated by reference herein.

Figure 2:
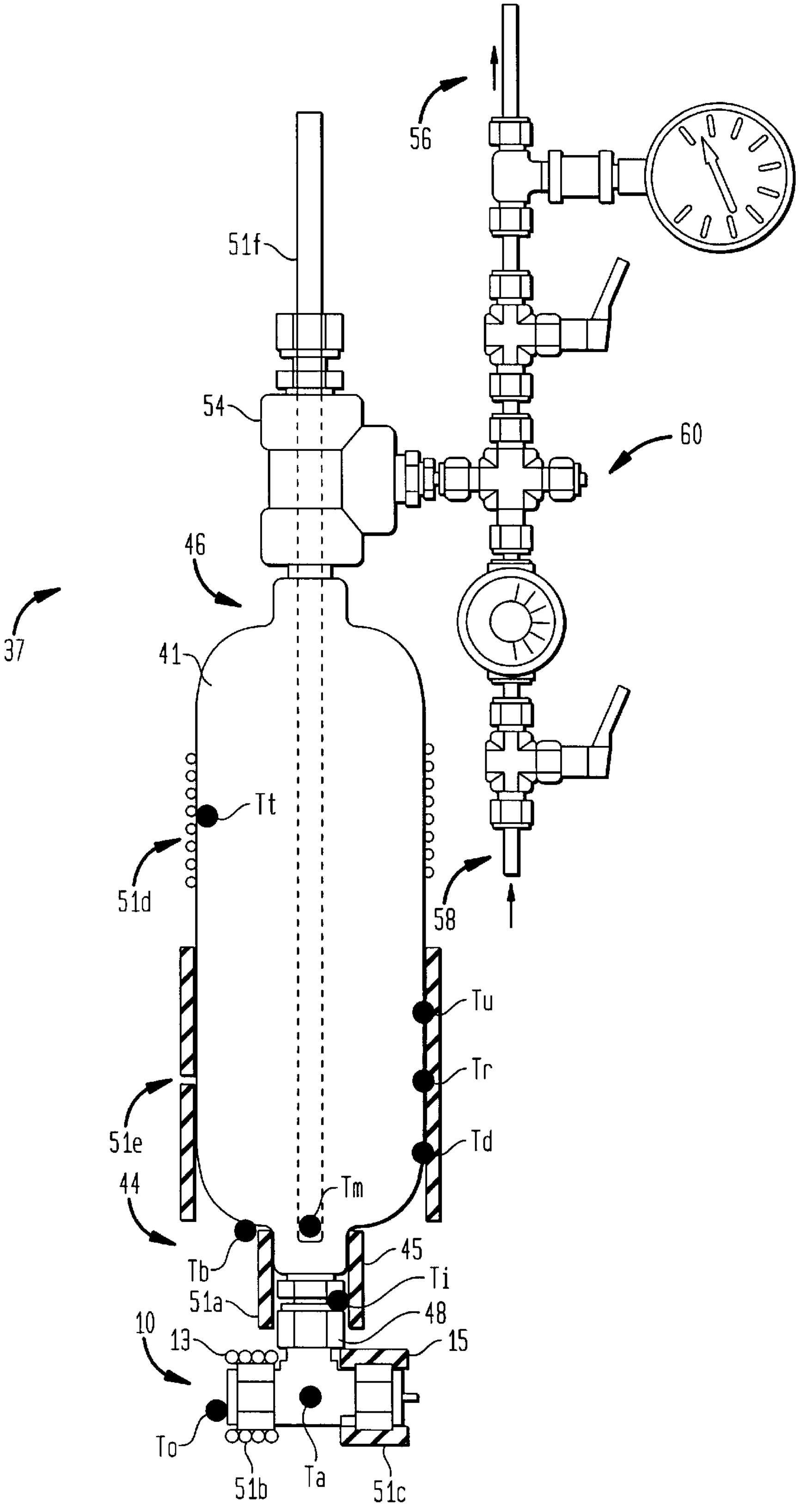
FIG. 2 is a schematic view of a fluid feed system for the embodiment of FIG. 1.

The solidifiable fluid may comprise any solidifiable polymer in a liquid form, such as a liquid polymer or a liquid solution including a polymeric material. In certain preferred embodiments, the fluid comprises a molten polymer such as polyethylene terephthalate ("PET"). The molten PET is supplied from fluid source 37, which may comprise a feed system, such as the feed system 37 shown in FIG. 2. The feed system of FIG. 2 is a laboratory apparatus. For commercial applications, a commercially available extruder for melting the PET and supplying the same under pressure is used. For example, a screw type extruder, which melts polymeric material at least in part under the influence of friction within the extruder, may be used. These extruders are well known in the art.

The feed system 37 includes a reservoir 41 in which PET in a granular form is placed. The reservoir has a first end 45 and a second end 46 opposite from the first end 45. The dispersing apparatus 10 is attached to the reservoir 41 at the first end 45 through a coupling 48. Preferably, a plurality of heaters 51 is used to melt the granular PET. As shown in FIG. 2, a band heater 51*a* is located at the coupling 48 between the reservoir 41 and dispersing apparatus 10. Heaters are also preferably located on the dispersing apparatus 10. A band heater 51*b* is located on the apparatus 10, at the first end 13 of the apparatus 10. A band heater 51*c* is also located on the dispersing apparatus 10, at the second end 15 of the apparatus 10.

The reservoir 41 is preferably heated interiorly and exteriorly. The reservoir 41 includes a rope heater 51*d* located closer to the second end 46 than band heaters 51*e*, which are located closer to the first end 45 of the reservoir 41. A heater is also preferably disposed within the reservoir, such as rod heater 51*f*, which is mounted on the second end 46 by a thermocouple 54.

The heaters heat the granulated PET contained in the reservoir 41 to the operating temperature for melting the PET. The temperature for melting the PET is between about 290° C. and 295° C.

For example, the particular feed system 37 shown in FIG. 2 has a maximum operating temperature of 310° C. The reservoir 41 shown in FIG. 2 is a 1 liter reservoir. The heaters, by way of example, may be: a 150 Watt band heater for band heater 51*a*; a 100 Watt band heater for band heater 51*b*; a 100 Watt band heater for band heater 51*c*; a 500 Watt rope heater for rope heater 51*d*; 650 Watt band heaters for band heaters 51*e*; and a 600 Watt rod heater for rod heater 51*f*. A sufficient amount of heat must be generated to melt enough PET for operation. For example, heaters 51*a–f* generate enough heat to melt several hundred grams of PET. The reservoir must have sufficient capacity for storing the molten PET. Preferably, the temperature is monitored at several points manually or, more preferably, automatically monitored. For example, the temperature may be monitored at points Ta, Tb, Td, Ti, To, Tm, Tr, Tt, and Tu shown in FIG. 2 to ensure that the temperature at those points does not exceed the maximum temperature for the components of the system.

The feed system 37 includes an assembly 60 for supplying pressure to the reservoir 41. The assembly 60 is attached to thermocouple 54 and supplies a pressurized gas, such as air to the reservoir 41. The pressure supplied to the reservoir provides a flow of molten PET through the apparatus 10. The assembly 60 has a first end 58 attached to a supply of pressurized gas and a second end 56 which leads to a vacuum or vent. The actual pressure required to supply a flow of molten PET depends upon the viscosity of the particular PET material utilized.

In embodiments using molten polymer, apparatus 10 is preferably designed to accommodate the heat of the molten polymer. By way of example, the atomizer disclosed in certain embodiments of U.S. Pat. No. 4,255,777, the disclosure of which is hereby incorporated by reference herein, may be mounted in a stainless steel ½" tee, modified to accommodate the atomizer. Such a device withstands pressures over 40 bar while being exposed to temperatures of 325° C. and up.

In operation, the molten PET is supplied through supply line 19 of the apparatus 10, flowing through the radial channels 44 and axial grooves 49 within the body 11. The PET flows to chamber 12 through the grooves 49 on either side of the electrode 25. As the PET flows towards orifice 22 in a stream, the PET flows past the tip 40 of the electrode 25. The voltage source 50 is operated to develop a charge on the tip 40 of the electrode 25. An electric field is developed between the electrode 25 and the body 11. The PET flows through the electric field between the electrode 25 and body 11 prior to exiting through the orifice 22. As the PET flows through the electric field, a charge is injected into the PET stream, providing the stream with a net charge.

Figure 3:
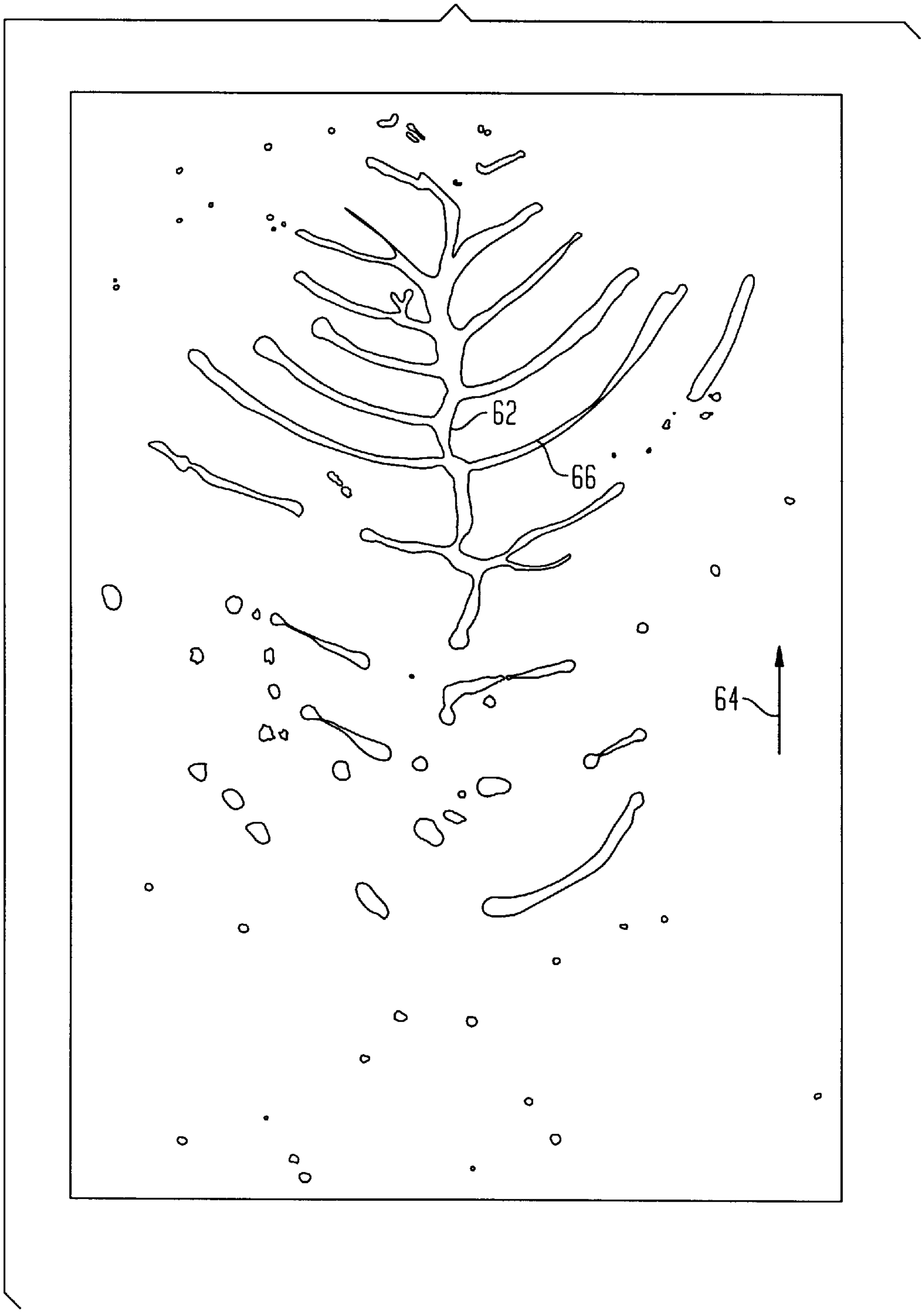
FIG. 3 is a view of a stream of fluid disrupted under the influence of a net charge.

Various portions of the stream of charged fluid repel each other under the influence of the net charge. The stream is disrupted under the influence of the net charge and begins to disperse, as shown in FIG. 3. At the same time, the molten PET cools and begins to solidify. Although the invention is not limited to any theory of operation, it is believed that the stream 62 issuing from the orifice 22 in a longitudinal direction 64 begins to disperse into elongated filaments 66 extending outwardly from the stream 62. Filaments 66 are developed at intervals along the stream 62. It is believed that these elongated filaments 66 of PET solidify into fibers as the molten PET cools. The fibers collect in the space outside the orifice 22 and may be directed toward electrode 52, in circumstances where the fibers retain a charge.

A throughput orders of magnitude greater than the known electrostatic methods discussed above is achieved for liquid polymers. By utilizing orifices having different sizes and varying the pressure of the solidifiable fluid, the throughput flow rate can be increased. The improved throughput is surprising in that prior art electrostatic methods of generating fibers have been unsuccessful in producing fibers on a large scale. Utilizing the above-disclosed method, fibers of PET have been produced at flow rates on the order of 1 gram per second through a single orifice.

Embodiments in accordance with the invention have achieved throughputs great enough for industrial production of fibers for use in non-woven materials, fabrics, filtration materials, agricultural applications and materials used in medical fields.

Figure 14:
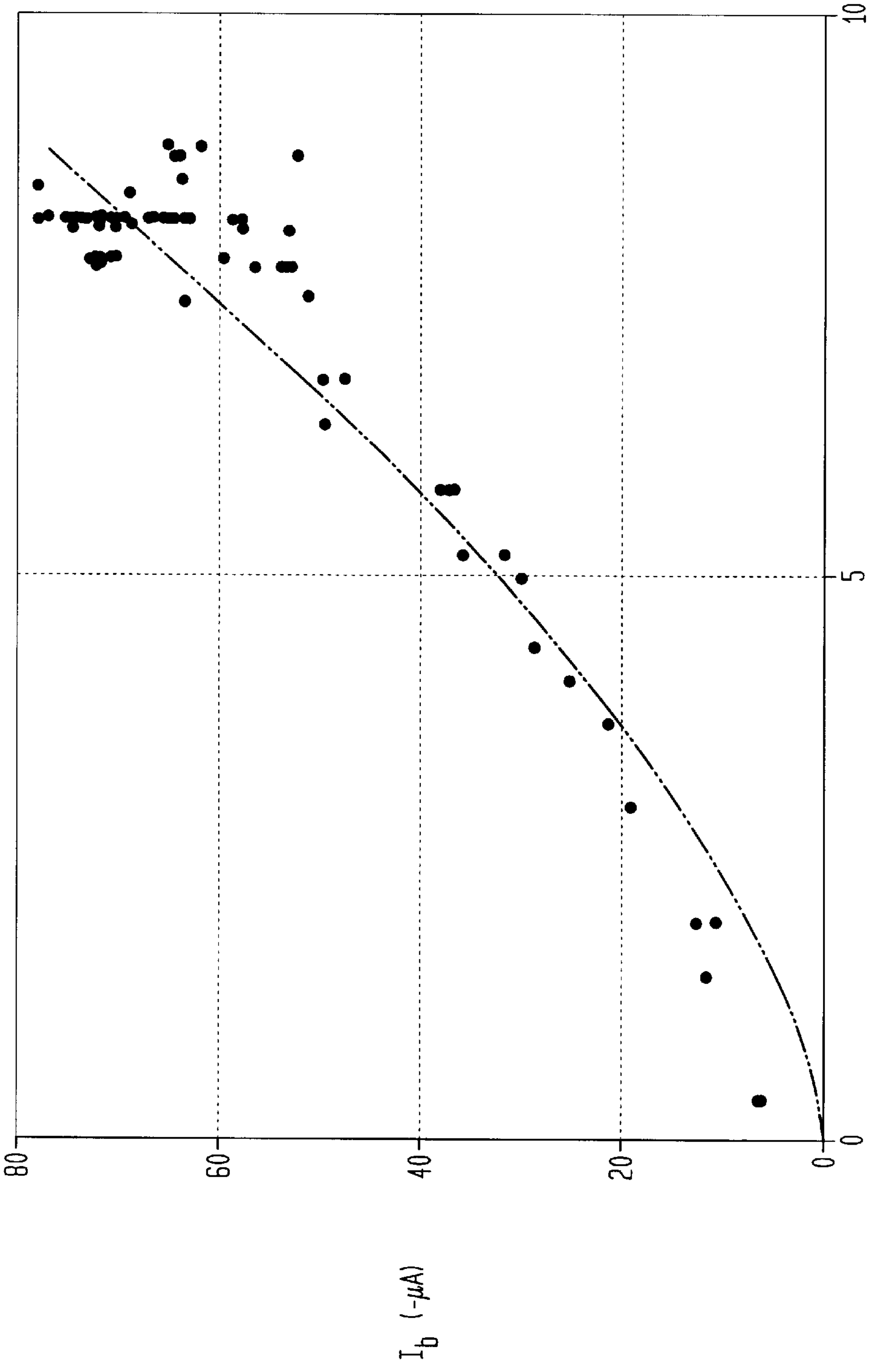
FIG. 14 is a graph illustrating the electrode to body current vs. operating voltage of the apparatus of FIG. 1.

The solidifiable fluid may comprise virtually any solidifiable fluid with a conductivity and/or charge mobility low enough that the charge injection process does not short out. In other words, if the charge travels though the fluid to the body of the apparatus prior to exiting the orifice of the apparatus, the stream of fluid will not receive a net charge and will not disrupt into filaments 66 (see FIG. 3) under the influence of net charge. If the fluid conductivity exceeds a conductivity on the order of $10^4$ cu and/or charge mobility exceeds $10^{-6}$ $m^2/V{\cdot}sec$, the fluid is inappropriate for using with the apparatus 10. When textile grade standard IV 0.640 molten PET was utilized in a device as shown in FIGS. 1 and 2, the current from the electrode to the body of the device, plotted against the input voltage is as shown in FIG. 14.

Fibers may be formed from any solidifiable material. For example, a ceramic and binder material may be used to form fibers in methods according to embodiments of the present invention. Metals, for example, may also be used to form fibers in other methods according to embodiments of the present invention. Another example is forming fibers from liquid flowing glass. Solidifiable fluids for forming fibers in methods according to the present invention include molten polymers and polymeric materials in a liquid solution. For example, the following solutions may be used: Tetra Hydrofurane and Urethane and LEXAN® and methylene chloride. Methods in accordance with embodiments of the invention may be used to form rigid or semi-rigid fibers. Fibers may be formed by solidifying the stream of solidifiable liquid into fibers of a solid or semi-solid material.

Fibers may be formed from any polymeric material. Just by way of example, fibers may be formed from polyesters, including: the polytetra fluoroethylene material known as TEFLON®; polyethylene terephthalate (PET); polybutylene terephthalate; polycarbonates such as LEXAN®; thermoplastic polyurethanes such as the materials known as PELLETHANE® or ESTANE®, Nylon, and a number of others. By manipulating the properties of the liquid polymer, or selection of the type of liquid polymer, fibers can be produced having virtually any strength and can be used as reinforcement of materials.

Direct charge injection for producing fibers may be achieved utilizing the charge injection devices described in certain embodiments of U.S. Pat. Nos. 4,255,777, 4,991,774, 5,093,602, 5,378,957, 5,391,958, and 5,478,266, the disclosures of which are hereby incorporated by reference herein. Certain preferred embodiments of the present invention include charge injection devices having features disclosed in certain embodiments of U.S. Pat. Nos. 6,161,785, 6,206,307, 6,227,465 and 6,474,573, the disclosures of which are all hereby incorporated by reference herein.

Figure 4:
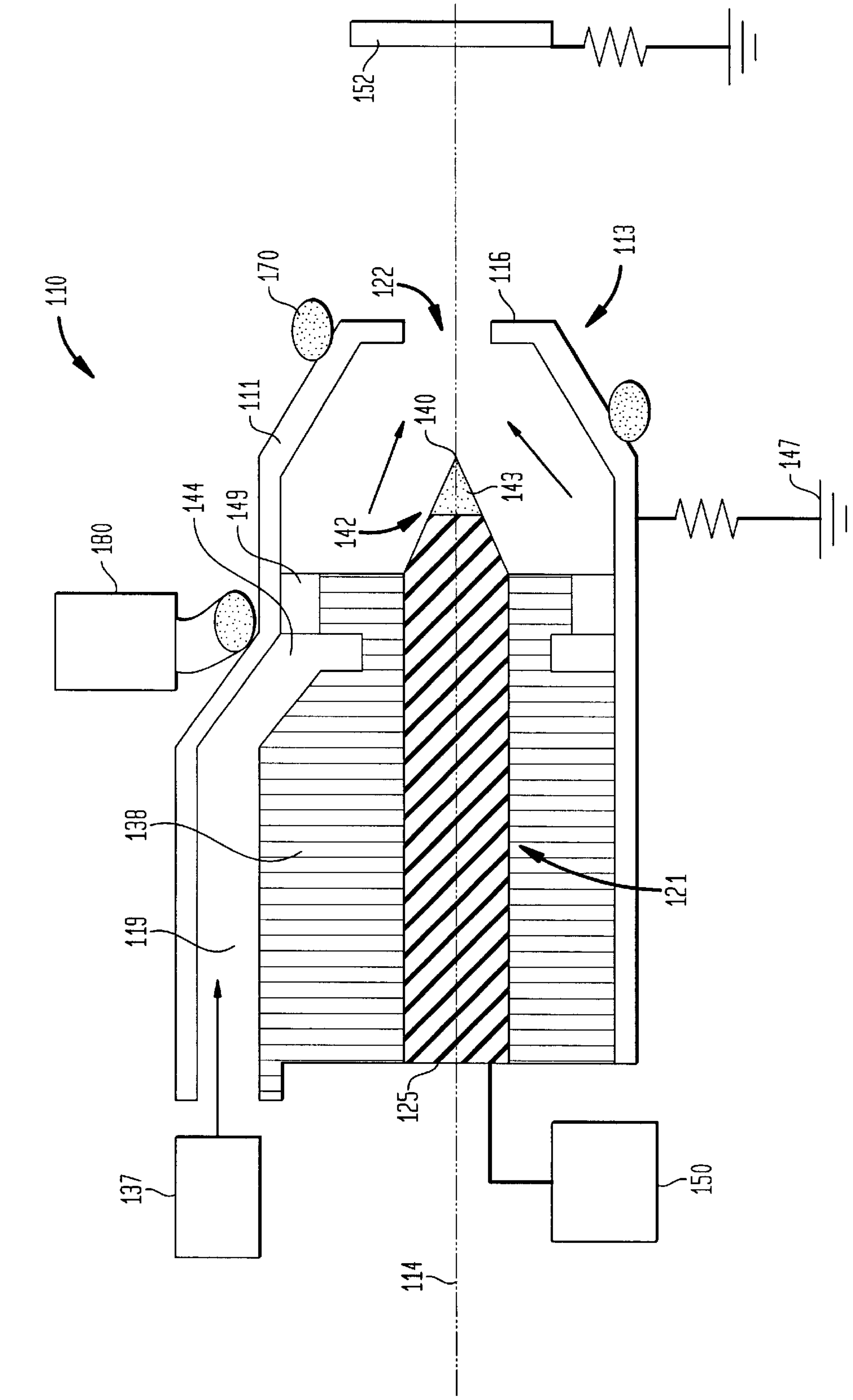
FIG. 4 is a cross-sectional view of an apparatus for implementing a method in accordance with another embodiment of the present invention.
Figure 5:
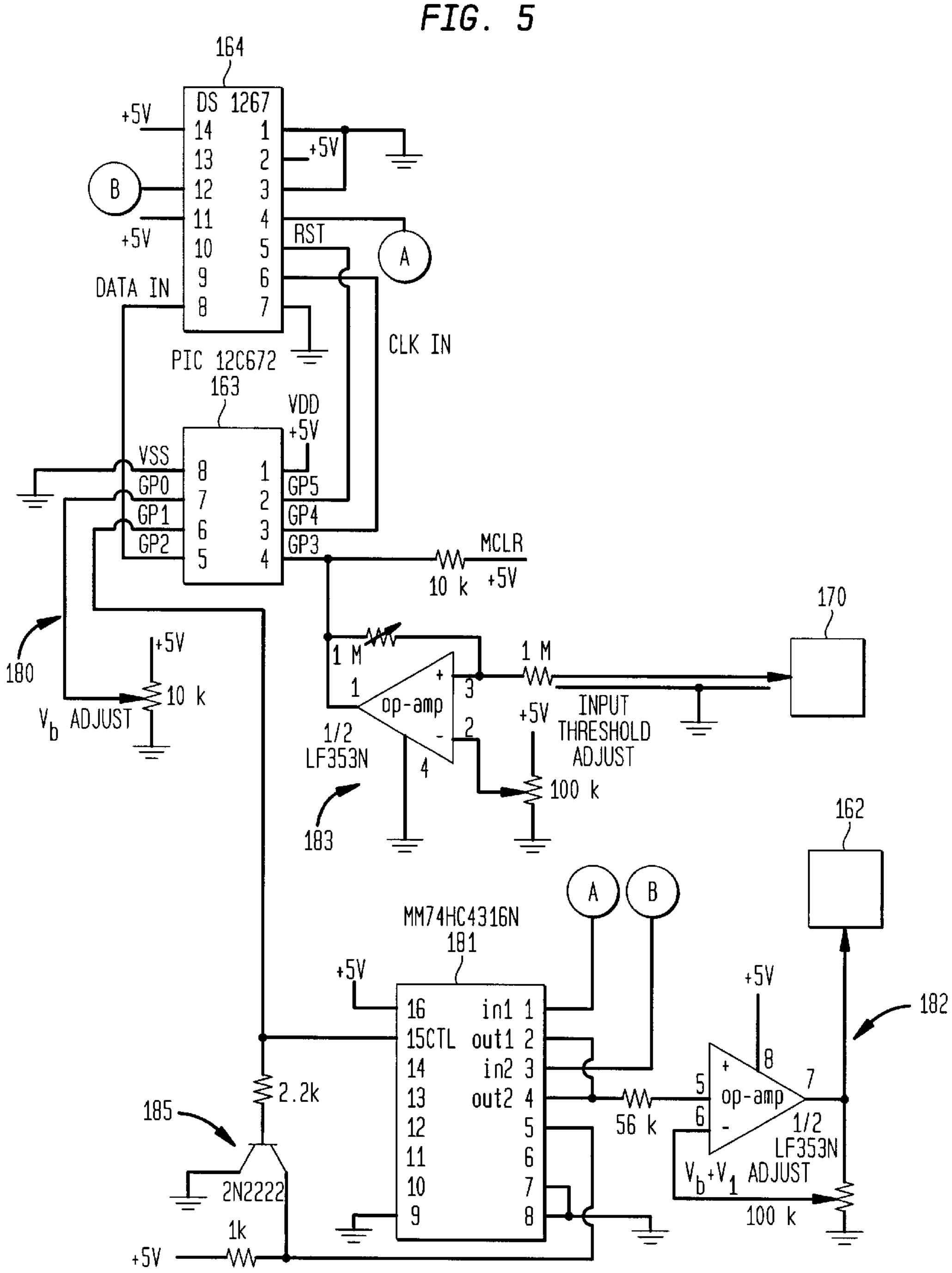
FIG. 5 is a schematic circuit diagram of a controller for the apparatus of FIG. 4.
Figure 6:
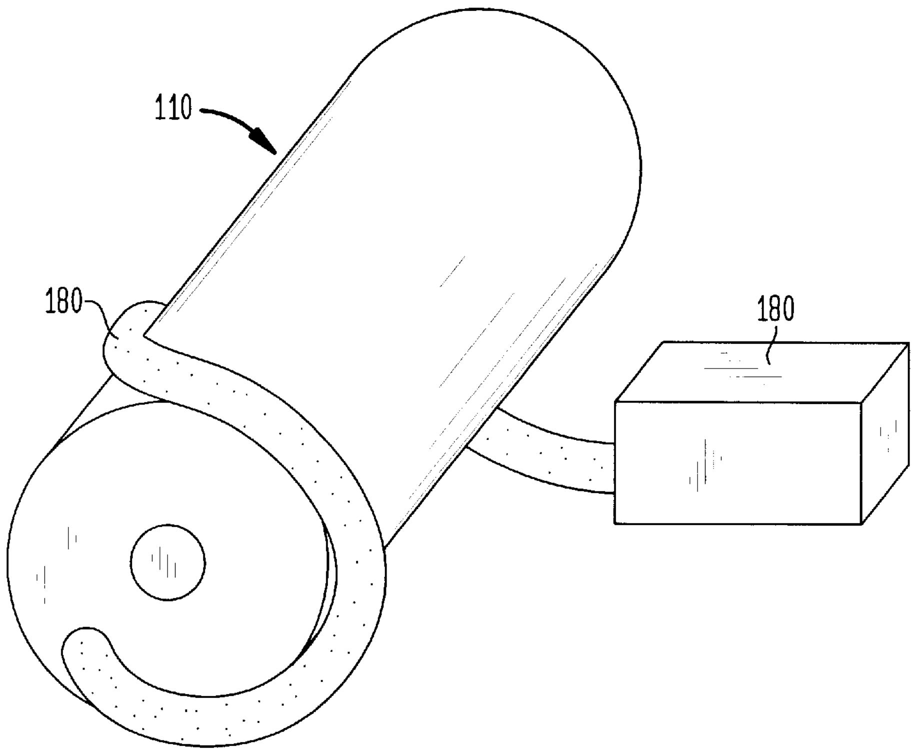
FIG. 6 is a schematic front-right partial perspective view of the apparatus of FIGS. 4 and 5.

In electrostatic atomizers, corona induced breakdown in the vicinity of the exiting charged stream has been experienced. When a critical level of charge is reached, corona-induced breakdown occurs and the plume of atomized fluid collapses. Should it be necessary or desirable to reduce the occurrence of this phenomenon in the dispersing apparatus, the dispersing apparatus 110 may be provided with a control-feedback system as shown in FIGS. 4–6 and as disclosed in certain embodiments of U.S. patent application Ser. No. 09/430,633, filed Oct. 29, 1999, the disclosure of which is hereby incorporated by reference herein. Alternatively, the pulsing atomizer of certain embodiments of U.S. patent application Ser. No. 09/430,632, filed Oct. 29, 1999, the disclosure of which is hereby incorporated by reference herein, may be used to address corona induced breakdown.

The embodiment of the invention shown in FIGS. 4–6 has a dispersing apparatus 110 with a body 111 defining an orifice 122. A voltage potential source 150 is connected to a central electrode 125 and a fluid source 137 supplies a fluid to the passages within the body 111. These elements are substantially as discussed above in connection with FIGS. 1 and 2 and similar elements in FIGS. 1 and 4 have similar reference numerals.

The dispersing apparatus 110 includes a sensor comprising a loop antenna 170. The antenna, for example, may be comprised of a 0.5-millimeter diameter insulated wire in the shape of an open loop curving around the orifice 122 of the apparatus 110. Power source 150 comprises a high voltage power source including a controller 180 and DC—DC converter 162 shown in FIG. 5. The controller 180 comprises a circuit having a central processing unit ("CPU") 163 connected to a dual digital resistor 164. Resistor 164 is connected to an analog switch 181, which is in turn connected to an amplifier 182. Amplifier 182 is connected to the DC—DC converter. A transistor 185 is connected to the switch 181 and CPU 163. The circuit includes another amplifier 183, to which the antenna 170 is connected. Amplifiers 182 and 183 may be included in one component, in other embodiments. There are many components known to those of ordinary skill in the art that can be utilized in the circuit shown in FIG. 5. The controller 180 is operated to vary the operating voltage for the dispersing apparatus 110, supplied by the voltage source 150. The antenna 170 detects signals and the components of the controller 180 control the operating voltage of the voltage source 150 to avoid corona-induced breakdown as disclosed in U.S. Pat. No. 6,206,307.

Figure 7:
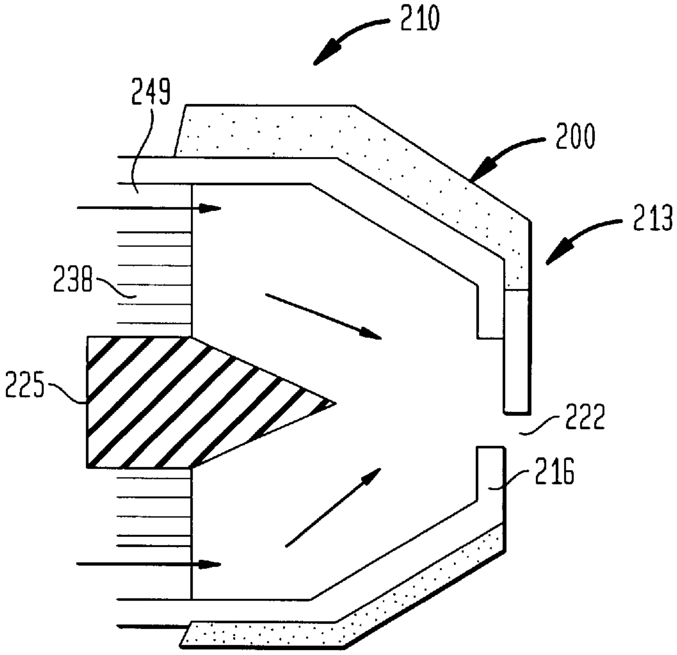
FIG. 7 is a schematic partial cross-sectional view of an apparatus for implementing the method in accordance with a further embodiment of the present invention.
Figure 8:
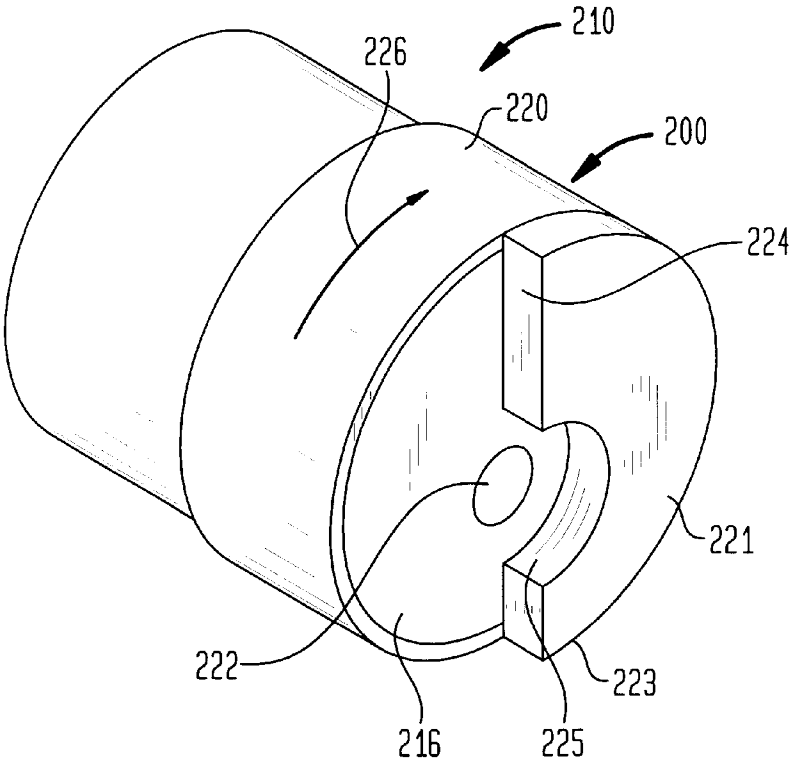
FIG. 8 is a front-left partial perspective view of the apparatus of FIG. 7.
Figure 9:
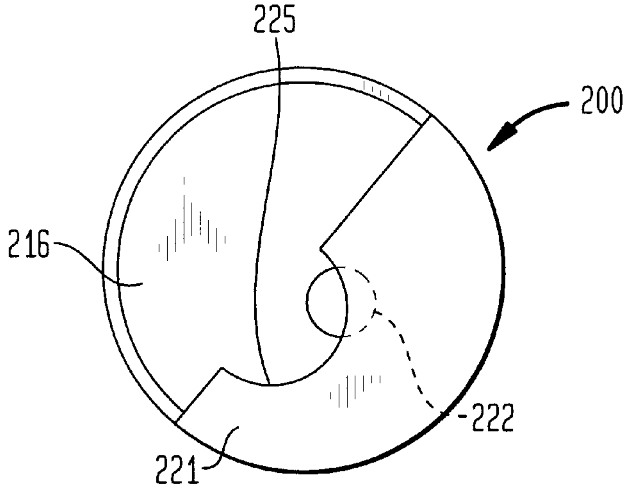
FIG. 9 is a partial front elevational view of the apparatus of FIGS. 7 and 8.

The orifice may, in certain preferred embodiments, be provided with a fixture 200 for varying the size of the orifice. As shown in FIG. 7, an apparatus 210, which is generally similar to the apparatus 10 as shown in FIGS. 1 and 2, includes the fixture 200 mounted on first end 213. Fixture 200 comprises a generally cylindrical sleeve 220 having a wall 221 which partially covers forward wall 216 of the apparatus 210. The wall 221 has a curvilinear edge 223 which joins with the sleeve 220. Wall 221 ends in the substantially linear edge 224 interrupted by a circular cutout 225. The cutout 225 is positioned along the wall 224 so that orifice 222 of the apparatus 210 may be exposed and unobstructed by the wall 221. The fixture 200 has an initial position, as shown in FIG. 8, in which the orifice 222 is exposed in cutout 225. Fixture 200 is rotatably mounted on the apparatus 210 and rotatable in a direction 226 so as to move wall 221 over the orifice 222, as shown in FIG. 9. In this manner, the orifice 222 may be partially obstructed by wall 221, thereby diminishing the effective size of the orifice 222. If the size of the orifice 222 should be changed to change the flow rate of the fluid during operation, the fixture 200 is rotated to vary the size of the orifice 222. In addition, it may be desirable to change the size of the orifice between operations of the apparatus 210. For example, the apparatus 210 may be operated with a solidifiable fluid having a first viscosity. The size of the orifice may be changed to operate the same apparatus 210 with a solidifiable fluid having a second viscosity to achieve the same throughput as achieved for the fluid having the first viscosity. In another example, the apparatus 210 may be operated with the orifice 222 partially obstructed by wall 221 of the fixture 200. In order to flush the orifice 222 of any debris or clogs, the fixture 200 may be rotated in a direction opposite to direction 226 to fully expose the orifice 222 and power to the central electrode may be turned off so that uncharged fluid issues from orifice 222. In this manner, the orifice 222 may be flushed of debris. The variable orifice disclosed in certain embodiments of U.S. Pat. No. 6,161,785, the disclosure of which is hereby incorporated by reference herein, may also utilized with a dispersing apparatus as discussed in the embodiments above.

Figure 10:
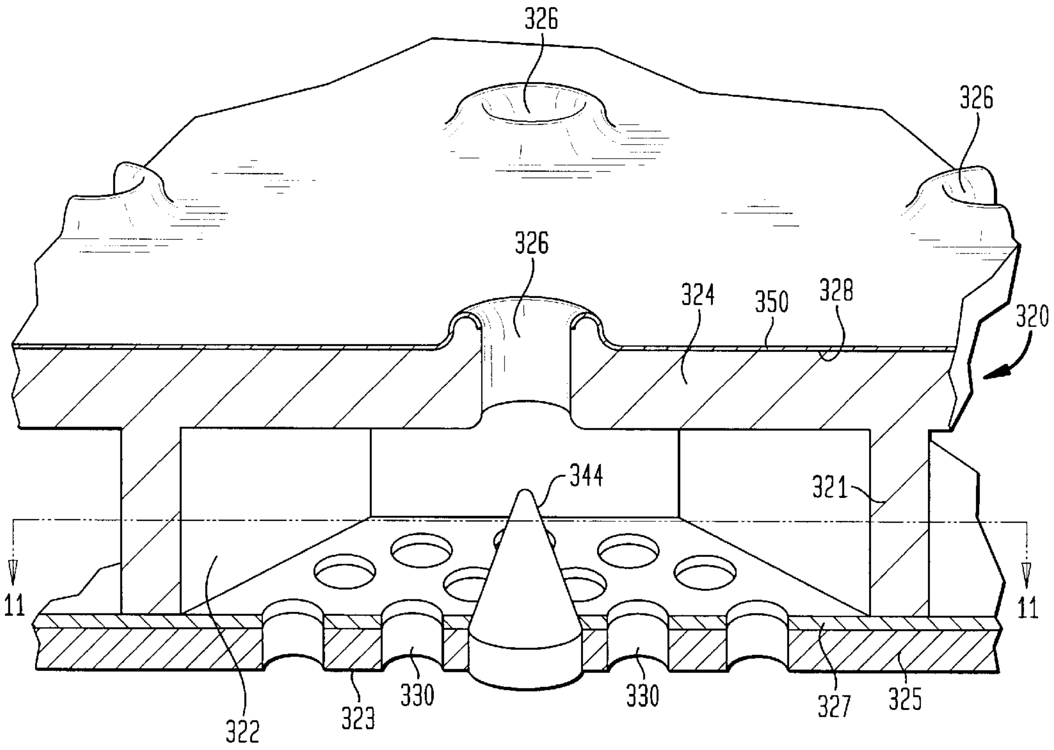
FIG. 10 is a side elevational view, partially in cross-section, of an apparatus in accordance with another embodiment of present invention.
Figure 11:
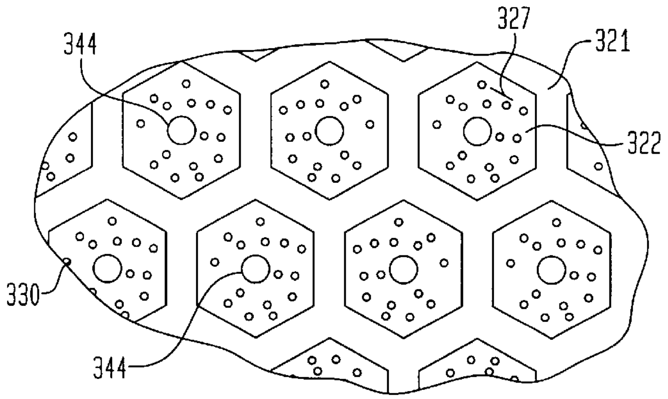
FIG. 11 is a cross-sectional view taken along line 11—11 in FIG. 10.

Certain embodiments disclosed in U.S. Pat. No. 6,474,573, the disclosure of which is hereby incorporated by reference herein, provide multiple orifices in a single nozzle referred to as the SPRITZ CHIP device. Similar structures can be used to provide multiple fluid streams for fibers formation. For example, such an embodiment is shown in FIGS. 10 and 11. A dispersing apparatus includes a body 320 having a first wall 324 and a second wall 325 generally parallel to the first wall but spaced therefrom. The first wall 324 defines a plurality of discharge orifices 326. The first wall 324 may be formed from a conductive material or from a dielectric material such as silicon dioxide. Where the first wall 324 comprises a dielectric material, an external electrode 350 common to all the orifices 326 is formed on an exterior surface 328 of the first wall 324 by depositing a coating of an electrically conductive material such as a metal on this surface. First wall 324 and second wall 325 are held apart from one another by an insulating internal structure 321, which may comprise a plurality of walls subdividing the space between the walls into a large number of hexagonal chambers or internal spaces 322. Hexagonal spaces 322 are disposed on center with orifices 326, so that each orifice is aligned with the center of one hexagonal space. Emitter electrodes 344 are mounted to second wall 325 and are in alignment with orifices 326. Second wall 325 may be comprised of an insulative material, or incorporates a dielectric layer 327 and a conductive layer 323 electrically connected to all of the emitter electrodes 344. The second wall 325 has a large number of fluid passages 330 extending through it. These orifices form a filter for filtering the solidifiable fluid to be utilized in forming fibers. The relative size of the passages 330 depends upon the particular solidifiable fluid utilized and the fluid viscosity. The size of the passages 330 is exaggerated in FIGS. 10 and 11 for quality of illustration.

Dispersing apparatus according to this embodiment of the invention can be fabricated using micro-mechanical fabrication techniques, similar to the techniques used for forming semiconductor chips and related devices. Photo-etching techniques, plating, vacuum deposition or other conventional techniques used in semiconductor fabrication may be used. The emitter electrodes can be formed by etching and/or deposition on the same mass of material used to form the second wall 325. For example, tungsten emitters can be formed by sputtering, by vapor deposition or by chemical vapor deposition. In a variant of this technique, the internal structure 321 can be fabricated together with the second wall 325 so that the internal structure is integral with the second wall. Also, although the internal structure is shown as completely dividing the space between walls 324 and wall 325 into entirely separate spaces 322, these spaces may communicate with one another.

Figure 12:
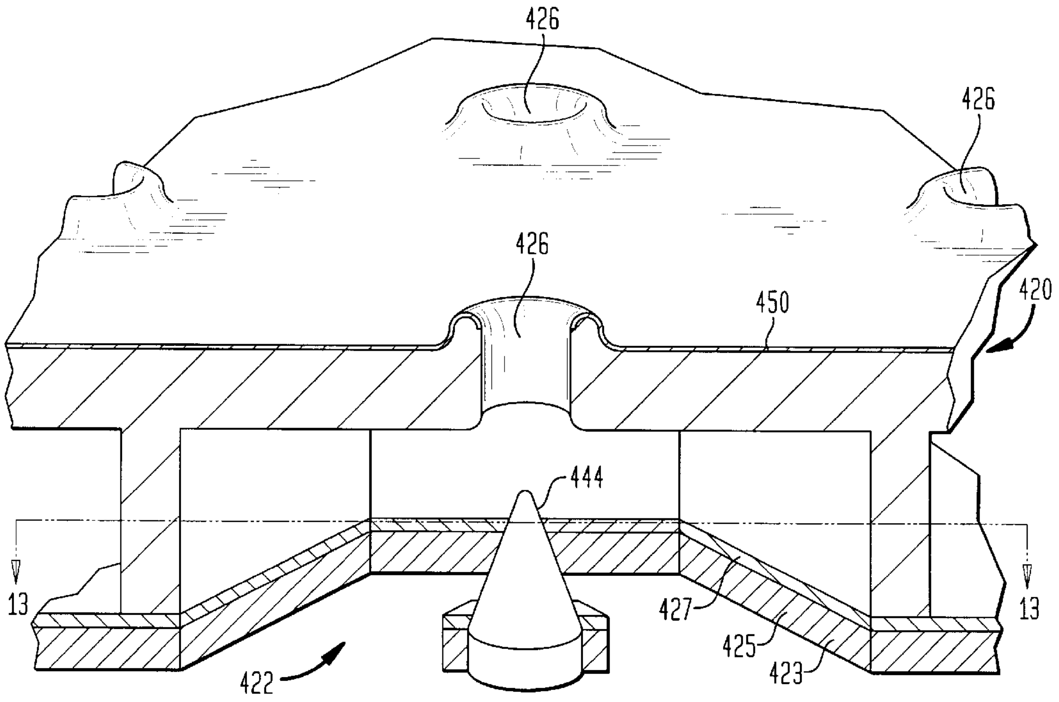
FIG. 12 is a side-elevational view, partially in section, of an apparatus in accordance with a further embodiment of the present invention.
Figure 13:
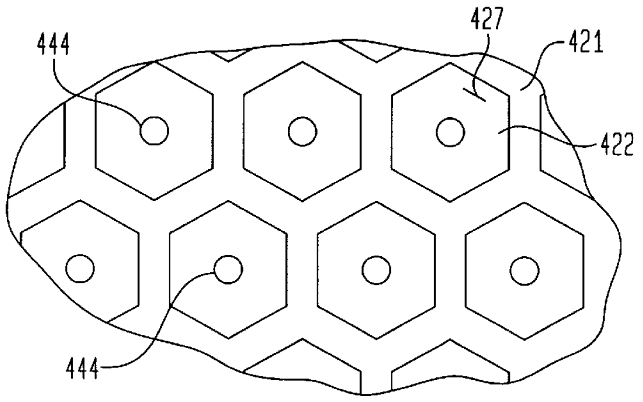
FIG. 13 is a cross-sectional view taken along line 13—13 in FIG. 12.

In another embodiment of the invention, the spaces 422 are open to the passages for delivery of the solidifiable fluid. (See FIGS. 12 and 13). Thus, second wall 425 does not include holes for filtering the solidifiable fluid. The remaining features of this embodiment are generally similar to those of FIGS. 10 and 11 and similar features of FIGS. 12 and 13 have reference numerals similar to FIGS. 10 and 11.

The devices shown in FIGS. 10 through 13 are used in a manner similar to the device discussed above with reference to FIGS. 1 and 2. For example, the electrode 344 is connected to a high voltage terminal of a power supply, whereas the second electrode 350 is connected to a lower potential, preferably by connecting the second electrode to ground. A third, grounded electrode (not shown), is provided remote from the device. The solidifiable fluid is delivered to the hexagonal space 322 through the fluid entry holes 330 and passes out through discharge orifices 326. Here again, the electric field between electrode 344 and the external electrode 350 causes injection of electrical charge into the fluid passing downstream into discharge orifices 326. The injected electrical charge causes dispersement of the fluid and the formation of fibers.

The devices shown in FIGS. 10 through 13 can be fabricated in any size, and the size of the orifices, hexagonal spaces and the distance between first wall and second wall depend upon the solidifiable fluid utilized.

The use of multiple orifices in the device provides several significant advantages. First, plugging or other problems affecting one orifice will not cause complete failure of the device. Also, any number of orifices can be used to provide a device with greater or lesser flow capability without altering the other operating characteristics of the device. A multi-orifice device can be utilized to produce fibers on a large, industrial or commercial scale.

Charged injection to form fibers in accordance with the invention can also be accomplished using an electron beam in proximity to an orifice so that electrons in the beam impinge on the fluid, either as it issues from the orifice, or just before the stream passes through the orifice. Electron beam devices previously used for atomization of liquids are disclosed in U.S. Pat. Nos. 5,378,957, 5,093,602, 5,391,958, the disclosures of which are hereby incorporated by reference herein and copies of which are annexed hereto.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

EXAMPLES

In the following examples, two types of PET were utilized in the apparatus of FIGS. 1 and 2. The diameter of the orifice was 406 micrometers and standard IV 0.640 PET was fed through the apparatus. The size of the orifice affects the operating pressure required for a given throughput of the fluid, as well as the attainable charged density. Larger orifice diameters reduce the operating pressure and achieve a lower charge density. In the 406 micrometer diameter apparatus, the maximum charge density achieved in the stream of PET is about 62% of the maximum charge density achieved in a 250-micrometer diameter orifice apparatus. The reservoir of the apparatus was pressurized to 19 bar (275 PSI). The flow rate of the molten PET through the 406 micrometer diameter orifice was 0.8 grams per second. The volumetric flow rate of the PET was about 0.57 milliliters per second.

The charge density of the fluid issuing from the orifice of the dispersing apparatus varies across the diameter of the orifice. The outer portions of the stream of fluid are highly charged, as compared with the central portion of the stream. The mean charge density for the 406 micrometer apparatus was 0.88 coulombs/$m^3$.

An operating voltage of only 2.7 kilovolts was required to charge the molten PET sufficiently to develop fibers. This is a surprising feature of the fiber development process. When the apparatus is utilized with Mil-C-7024 type II calibrating fluid, 5–6 kilovolts is required to disrupt the stream of calibrating fluid.

The fibers generated in the 406 micrometer diameter apparatus were generally smooth and tapered. A small fraction of fibers were branched and included junction points between fibers. Many of the fibers were hollow. It is believed that the hollow fibers resulted from bubbles trapped in the molten PET extend during the fiber generation process. Many of the textile grade PET fibers had diameters of 100 micrometers or more.

The 406 micrometer diameter apparatus was utilized with standard IV 0.589 PET. This PET is less viscous than the textile grade PET discussed above. The textile grade PET has a viscosity of 1845 poise at 295° C. and the less viscous PET has a viscosity of 1180 poise at 295° C.

The feed system was operated at the same pressure. The fibers produced had diameters below 100 micrometers and many had diameters of 10 micrometers or less. Relatively large droplets of about 700 micrometers in diameter were attached to the fibers. It is believed that the textile grade PET did not produce such droplets because the textile grade PET cooled before droplets were formed. As seen in FIG. 3, for example, the stream of fluid issuing from the orifice disrupts into elongated filaments which may eventually form droplets. On the other hand, the branching produced in the textile grade PET indicates that the stream of PET cooled prior to formation of independent fibers. Thus, controlled heating of the zone outside the orifice, in which fiber generation occurs, may be utilized to enhance the production of fibers. The PET fibers retained a charge after being formed. The finer fibers retained a higher charge and were attracted the ground electrode spaced from the orifice.

Methods according to embodiments of the present invention inject a net charge into the solidifiable fluid and the charge is trapped within the fiber after the fluid solidifies. The charged fibers can be later used as, for example, material for an electrostatic filter.

The PET fibers had diameters of 10 micrometers or less. Much smaller fibers may be produced utilizing methods and apparatus in accordance with embodiments of the invention. In another example, an apparatus as shown in FIGS. 1 and 2 was utilized to form fibers from a thermoplastic polyurethane known as PELLETHANE®, provided in a solution with tetra hydrofurane. The fibers produced ranged in diameter from about 20 nanometers to about 500 nanometers.

I claim:

1. A method of producing fibers, comprising:

a) providing a stream of a solidifiable fluid;

b) providing the stream with a net charge so as to disrupt the stream by passing the stream through a body defining an orifice so that the stream passes through an electric field before exiting the orifice; and c) allowing the disrupted stream to solidify to form fibers.

2. The method of claim 1, wherein the step of providing the stream with a net charge includes injecting a net charge into the stream.

3. The method of claim 2, wherein the step of injecting a net charge includes injecting a net charge so as to develop a self electric field for the stream of at least 0.5 megavolts per meter.

4. The method of claim 1, wherein the solidifiable fluid comprises a liquid polymer.

5. The method of claim 4, wherein the liquid polymer comprises a molten polymer.

6. The method of claim 1, wherein the solidifiable fluid is selected from the group consisting of: a liquid glass; a liquid polyester; liquid polytetrafluoroethylene; liquid polyethylene terephthalate; liquid polybutylene terephthalate; and liquid thermoplastic polyurethane.

7. The method of claim 1, wherein the solidifiable fluid comprises a liquid solution including a polymeric material.

8. The method of claim 5, wherein the step of providing a stream includes heating a polymeric material and the step of allowing the stream to solidify comprises allowing the disrupted stream to cool.

9. The method of claim 7, wherein the step of providing a stream includes providing a polymeric material in a solvent and the step of allowing the stream to solidify comprises allowing the solvent to evaporate.

10. The method of claim 1, wherein the step of providing a stream of a solidifiable fluid comprises passing the solidifiable fluid through an orifice at a rate of at least 0.1 grams per second.

11. The method of claim 10, wherein the step of providing a stream of a solidifiable fluid comprises passing the solidifiable fluid through an orifice at a rate of at least 0.5 grams per second.

12. The method of claim 11, wherein the step of providing a stream of a solidifiable fluid comprises passing the solidifiable fluid through an orifice at a rate of at least 1 gram per second.

13. The method of claim 1, wherein the step of providing the stream with a net charge comprises passing the stream between a pair of electrodes in the vicinity of the orifice while maintaining a potential difference between the electrodes.

14. The method of claim 13, wherein one of the pair of electrodes comprises the body defining the orifice.

15. The method of claim 1, wherein the step of injecting a net charge comprises passing the stream past an electron gun located adjacent the orifice.

16. The method of claim 1, further comprising heating the disrupted stream as it passes out of the orifice.

17. The method of claim 1, wherein the step of providing the stream with a net charge provides the stream with a charge density of at least 0.5 coulombs per cubic meter.

18. A method of producing fibers, comprising:

a) providing a plurality of streams of solidifiable fluid;

b) providing the plurality of streams with a net charge so as to disrupt the streams by passing each stream through a structure defining an orifice so that the stream passes through an electric field prior to exiting the orifice; and c) allowing each disrupted stream to solidify to form fibers.

19. A method of forming a charged solid, comprising:

a) providing a stream of a solidifiable fluid;

b) providing the stream with a net charge by passing the stream through a body defining an orifice so that the stream passes through an electric field prior to exiting the orifice;

c) allowing the stream of solidifiable fluid to solidify while still charged.

20. The method of claim 19, wherein the stream disrupts under the influence of the net charge.

21. The method of claim 19, wherein the stream of solidifiable fluid has a maximum charge mobility of $10^{-6}$ $m^2/V{\cdot}sec$.

22. The method of claim 19, wherein the stream of solidifiable fluid has a minimum net charge of 0.1 coulombs per cubic meter.

23. A method of forming fibers comprising the steps of:

(a) providing a stream of a solidifiable fluid at a rate of at least about 0.01 grams per second;

(b) injecting electrical charge into the stream of solidifiable fluid, whereby the stream will tend to disperse and form filaments; and (c) solidifying the filaments.

24. The method of claim 23 wherein the step of injecting electrical charge is performed so as to inject at least about 0.6 coulomb per cubic meter of said solidifiable fluid.

25. The method of claim 23 wherein the step of providing a stream comprises providing a stream at a rate of at least 0.1 grams per second.

26. The method of claim 25 wherein the step of providing a stream comprises providing a stream at a rate of at least 1 gram per second.

27. A method of forming fibers comprising the steps of:

(a) providing a stream of a solidifiable fluid at a rate of at least about 0.01 grams per second;

(b) injecting at least about 0.6 coulomb of electrical charge per cubic meter of fluid into said stream of solidifiable fluid, whereby the stream will tend to disperse and form filaments; and (c) solidifying the filaments.

28. A method of forming fibers comprising the steps of a) providing a stream of a solidifiable fluid at a rate of at least about 0.03 millimeters per second;

b) injecting electrical charge into said stream of solidifiable fluid, whereby the stream will tend to disperse and form filaments; and c) solidifying the filaments.

29. A method as claimed in claim 28, wherein the step of injecting electrical charge is performed so as to inject at least 1 coulomb per cubic meter of said solidifiable fluid.

30. The method of claim 28, wherein the step of providing a stream comprises providing a stream at a rate of at least 0.1 millimeters per second.

31. The method of claim 30, wherein the step of providing a stream comprises providing a stream at a rate of at least about 0.5 milliliters per second.

* * * * *